(12) United States Patent
Gerresheim et al.

(10) Patent No.: US 6,668,887 B1
(45) Date of Patent: Dec. 30, 2003

(54) VEHICLE TIRE WITH REINFORCEMENT BENEATH OVERWIDE CIRCUMFERENTIAL TREAD GROOVE

(75) Inventors: Manfred Gerresheim, Obertshausen (DE); Klaus Riehl, Grundau (DE); Saburo Miyabe, Grossauheim (DE); Hans-Joachim Winter, Gelnhausen (DE)

(73) Assignee: Dunlop GmbH, Hanau (DE)

( * ) Notice: Subject to any disclaimer, the term of this patent is extended or adjusted under 35 U.S.C. 154(b) by 175 days.

(21) Appl. No.: 09/807,623
(22) PCT Filed: Aug. 26, 2000
(86) PCT No.: PCT/EP00/08331
§ 371 (c)(1), (2), (4) Date: Jul. 2, 2001
(87) PCT Pub. No.: WO01/15918
PCT Pub. Date: Mar. 8, 2001

(30) Foreign Application Priority Data

Aug. 31, 1999 (DE) .......................... 199 41 339

(51) Int. Cl.$^7$ .................. B60C 9/18; B60C 3/06; B60C 11/03; B60C 111/00; B60C 9/22; B60C 9/26
(52) U.S. Cl. .................. 152/209.26; 152/209.9; 152/455; 152/456; 152/526; 152/528; 152/531; 152/532; 152/533; 152/554
(58) Field of Search .................. 152/209.26, 455, 152/456, 532, 209.9, 531, 526, 534, 528, 533, 554

(56) References Cited

U.S. PATENT DOCUMENTS 3,841,372 A   10/1974   Boileau
5,759,313 A   6/1998    Shirai et al.

FOREIGN PATENT DOCUMENTS

| DE | 4032072 A1 | 4/1992 | |
| EP | 676305 A1 | 10/1995 | |
| EP | 0 738 616 A1 * | 10/1996 | 152/209.26 |
| JP | 6143924 A | 5/1994 | |
| JP | 8244408 A | 9/1996 | |

* cited by examiner

Primary Examiner—Adrienne C. Johnstone
(74) Attorney, Agent, or Firm—Birch, Stewart, Kolasch & Birch, LLP

(57) ABSTRACT

A vehicle tire is described having at least one carcass ply extending between bead regions, a tread region (1) and a belt arrangement (3) disposed between the carcass and the tread as well as a tread profile provided in the tread region having at least one overwide circumferential groove (2) disposed in particular away from the middle and on the inner side of the tire, with the tire region disposed beneath the overwide circumferential groove, which has in particular a width of more than 30 mm, being formed with additional localised reinforcement in the axial direction.

1 Claim, 5 Drawing Sheets

VEHICLE TIRE WITH REINFORCEMENT BENEATH OVERWIDE CIRCUMFERENTIAL TREAD GROOVE

This application is the national phase under 35 U.S.C. §371 of PCT International Application No. PCT/EP00/08331 which has an International filing date of Aug. 26, 2000, which designated the United States of America.

TECHNICAL FIELDS

The present invention relates to a vehicle tire having at least one carcass ply extending between bead regions, a tread region and a belt arrangement disposed between the carcass and the tread as well as a tread profile or pattern provided in the tread region having at least one overwide circumferential groove disposed in particular away from the middle and on the inner side of the tire.

BACKGROUND ART

In the design of tread profiles or patterns in the tread region of pneumatic tires for vehicles, it can be of advantage for a variety of reasons, particularly for reasons of tire noise minimization or also to improve the aquaplaning properties, to provide at least one particularly wide groove extending over the tire circumference which can be straight or also with waves and the like. The width of such a groove can be, for example, a 30 mm or more. However the use of such grooves in a tread profile can lead to a structural weak spot at which, when the tire is in use, an unwanted, higher growth can occur if special measures are not taken.

It is the object of the present invention to design a vehicle tire of the initially named kind in such a way that, on the one hand, the advantages arising from the use of overwide circumferential grooves can be used to the full and, on the other hand, weak spots resulting from the existence of such grooves can be avoided and even additional advantages can be achieved with regard to the properties of the respective tire.

SUMMARY OF THE INVENTION

Accordingly the object of the present invention is generally satisfied in that the tire region disposed beneath the overwide circumferential groove, which has, in particular, a width of more than 30 mm, is provided with additional localised reinforcement in the axial direction.

In accordance with a preferred embodiment of the present invention, the particularly wide groove is located on the respective inner tire side, and only such circumferential grooves which do not lead to any structural weak spots in the tire construction are located on the outer tire side.

The additional localised reinforcements to be provided beneath the overwide groove can be realised in different manners in accordance with the present invention, with the possibility of combining different solutions also existing.

A first version for the provision of the a required local reinforcement includes the use of at least one additional winding bandage, in particular using a nylon strip, or an additional strip consisting of an essentially non-extensible material, in particular an aramide, beneath such a winding bandage. An asymmetrical tire construction is thus created which leads to specifically pre-determinable tire properties.

Another possibility of providing a reinforcement in the region beneath the circumferential groove includes the designing of a belt ply arrangement in such a way that cord plies, in particular steel cord plies, are used beneath the weak spot created by the groove, such cords extend at a less steep angle towards the direction of the periphery than in the remaining region of the overall belt ply arrangement. This principle can be particularly realised advantageously using part belts. In this way, for example, unwanted growth of the tire on the inner tire side, where the overwide groove is positioned, can be avoided at high speeds, while cords are used on the outer tire side which extend towards the circumferential plane at a lower angle, whereby the handling properties of the tire can be improved.

In accordance with another embodiment of the invention, a folded belt arrangement is used in which at least one unfolded steel cord ply is enclosed at least at one side by a folded ply consisting, for example, of an aramide, in such a way that the turned-over end of the fold extends so far in the direction of the tire center that it spans the region below the groove.

Further possibilities of providing corresponding reinforcement comprise arranging a circumferential rubber strip having a high modulus beneath the groove and preferably directly adjacent to the carcass and/or drawing the turned-over end of at least one carcass ply so far upwards in the direction of the tire center and in contact with the carcass ply assembly that said carcass ply end extends over the region beneath the groove. Moreover, the groove base can be, alternatively or additionally, designed to increase stability, for example by means of a convex base shape or by means of a special structure, in particular in the form of angular or rounded elevations projecting in the direction of the circumference.

BRIEF DESCRIPTION OF DRAWINGS

Further advantageous embodiments and features of the invention are given in the dependent claims and are described below with reference to the drawing in which are shown:

MODE FOR CARRYING OUT THE INVENTION

Figure 1:
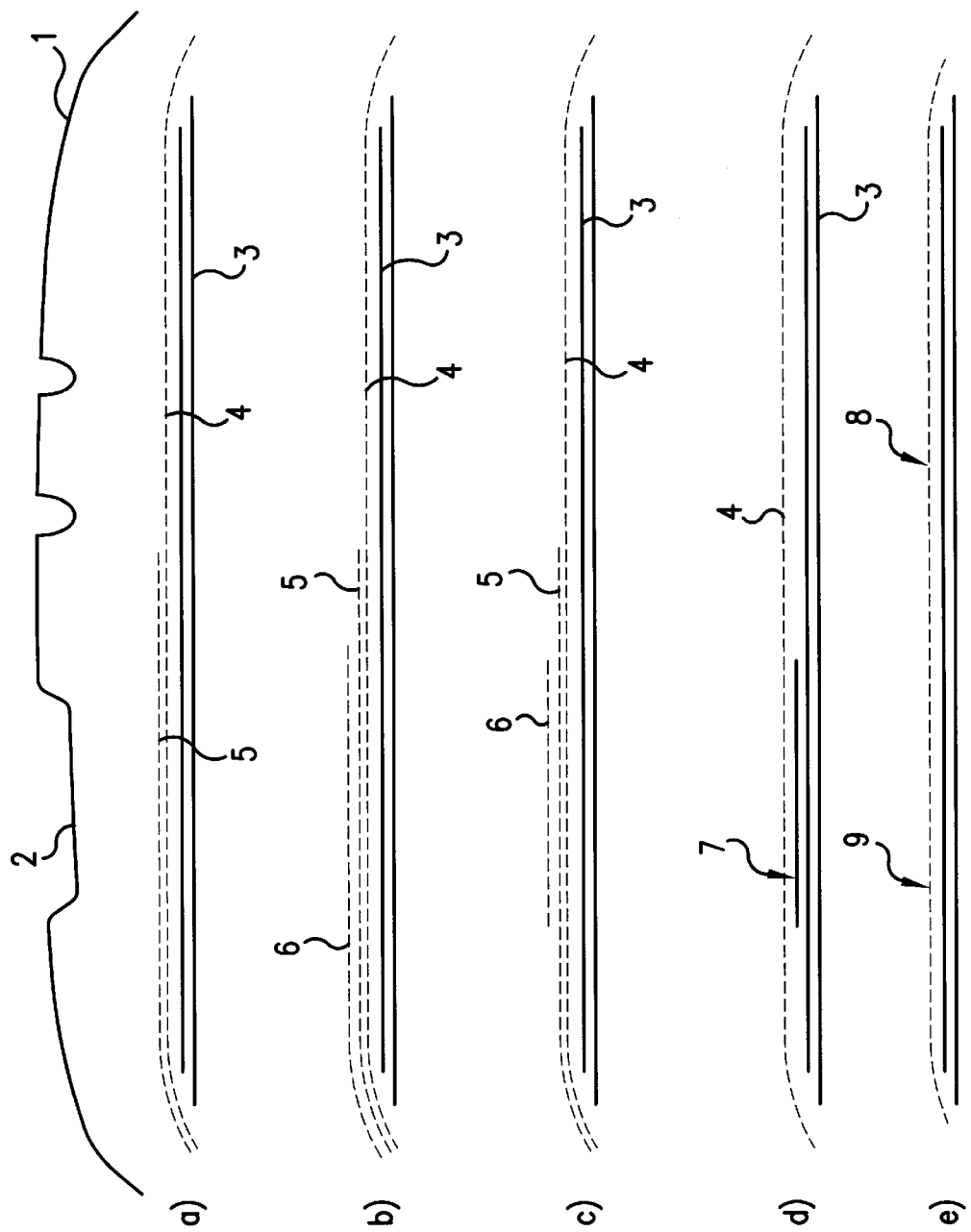
FIG. 1 A schematic representation of a tread contour in conjunction with various possibilities of asymmetrical reinforcement by means of winding bandages.

FIG. 1 shows a tread contour 1 having an overwide groove 2 on the inner tire side. A belt arrangement 3, in particular a two-ply steel cord belt, is provided beneath the tread region and surrounded by at least one strip winding. The winding strips can be wound to overlap, in a spliced manner and/or with pre-determinable spacings.

To reinforce the region of the tire disposed beneath the groove 2, a partial bandage 5 is provided in version a), in addition to the full bandage 4 extending over the whole belt ply width, the partial bandage 5 extending from the inside end of the belt ply arrangement 3 to approximately the tire center and thus fully spanning the region beneath the groove 2.

In comparison to embodiment version a), version b) is also provided with an additional part bandage 6 which covers the radially inner part bandage 5, but which is led less close to the tire center than part bandage 5.

Version c) differs from version b) in that the additional part bandage 6 has a much smaller width than the radially inner part bandage 5 and is located essentially only in the region of the groove, while covering this well, and is not wound up to the inside edge of the belt ply arrangement 3.

In accordance with version d), the required local reinforcement is achieved by a circumferential aramide reinforced strip 7, which is disposed radially within the full bandage 4 and whose width is greater than the width of the groove 2. The mentioned part and full bandages 4, 5, 6 consist preferably of nylon.

The embodiment version e) realises the required reinforcement on the inner side beneath the groove 2 by means of an aramide part bandage 9 which is, at least essentially non-extensible; and a conventional nylon part bandage 8 adjoins this aramide part bandage 9 in the same plane. Versions d) and e) can also be combined with versions a) to c).

Figure 2:
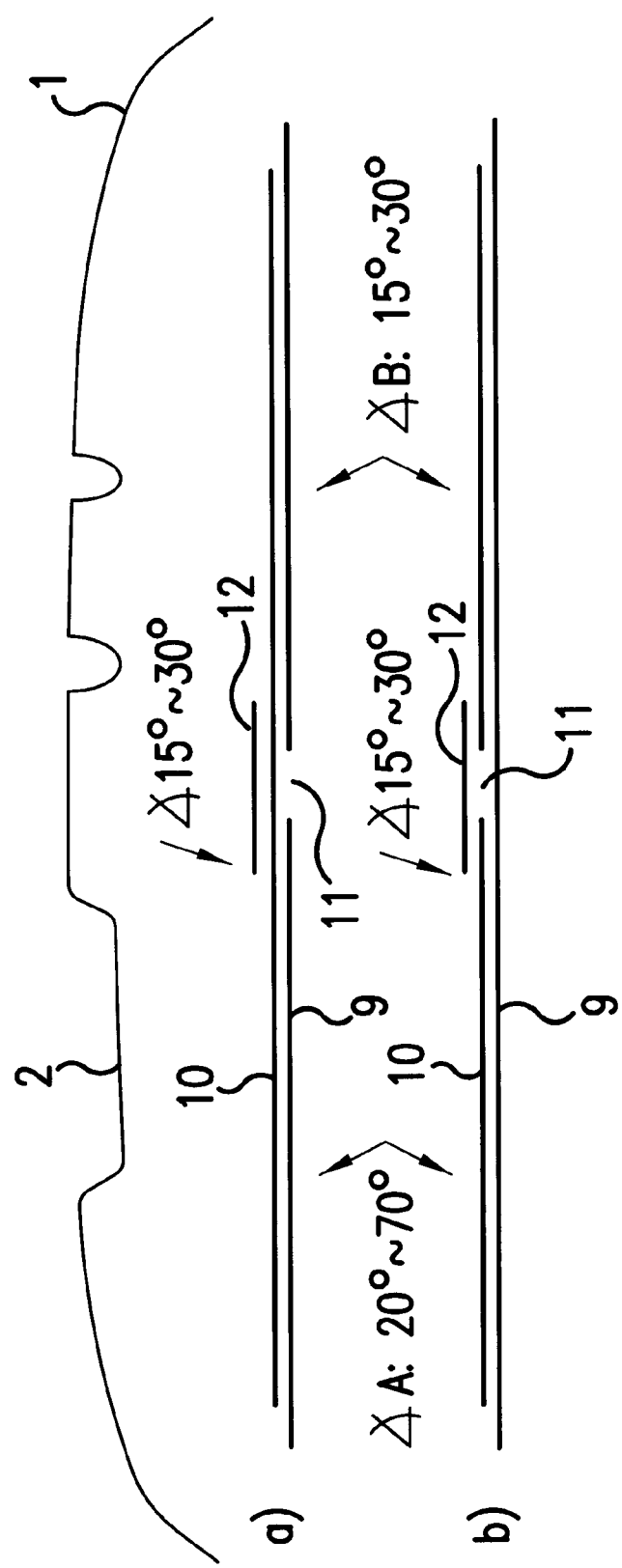
FIG. 2 A schematic representation of a tread contour with various possibilities of providing asymmetrical reinforcements by means of belt ply designs.

Analogue to the schematic representation of FIG. 1, FIG. 2 shows various possibilities of providing the required asymmetrical reinforcement by means of belt ply designs.

In accordance with embodiment version a), the belt ply arrangement comprises a two-part inner belt ply 9 and a one-part radially outer belt ply 10 having a cord angle to the circumferential plane of approximately 15 to 30°, with an additional narrow covering belt ply 12 being provided above the spacing region 11 formed between the two part belt plies 9. These belt plies and part belt plies preferably consist of steel cord plies. The angles selected between the cords of the cord plies and the circumferential plane are indicated in FIG. 2 by corresponding reference arrows at 20 to 70° for the belt plies on the inner tire side and at 15 to 30° on the outer tire side and for the narrow covering plies respectively. This angle selection ensures the required operating safety of the tire and additionally produces handling advantages.

Version b) differs from version a) in that the radially outer belt ply 10 is made of two part plies.

The part belt plies provided in each case can be selected variably in width, with it also being possible to use part belt plies both for the radially inner and for the radially outer belt plies respectively. The location of the spacing region 11 can be selected freely within a large region to influence the tire properties; however, it should not be disposed beneath the groove 2.

Figure 3:
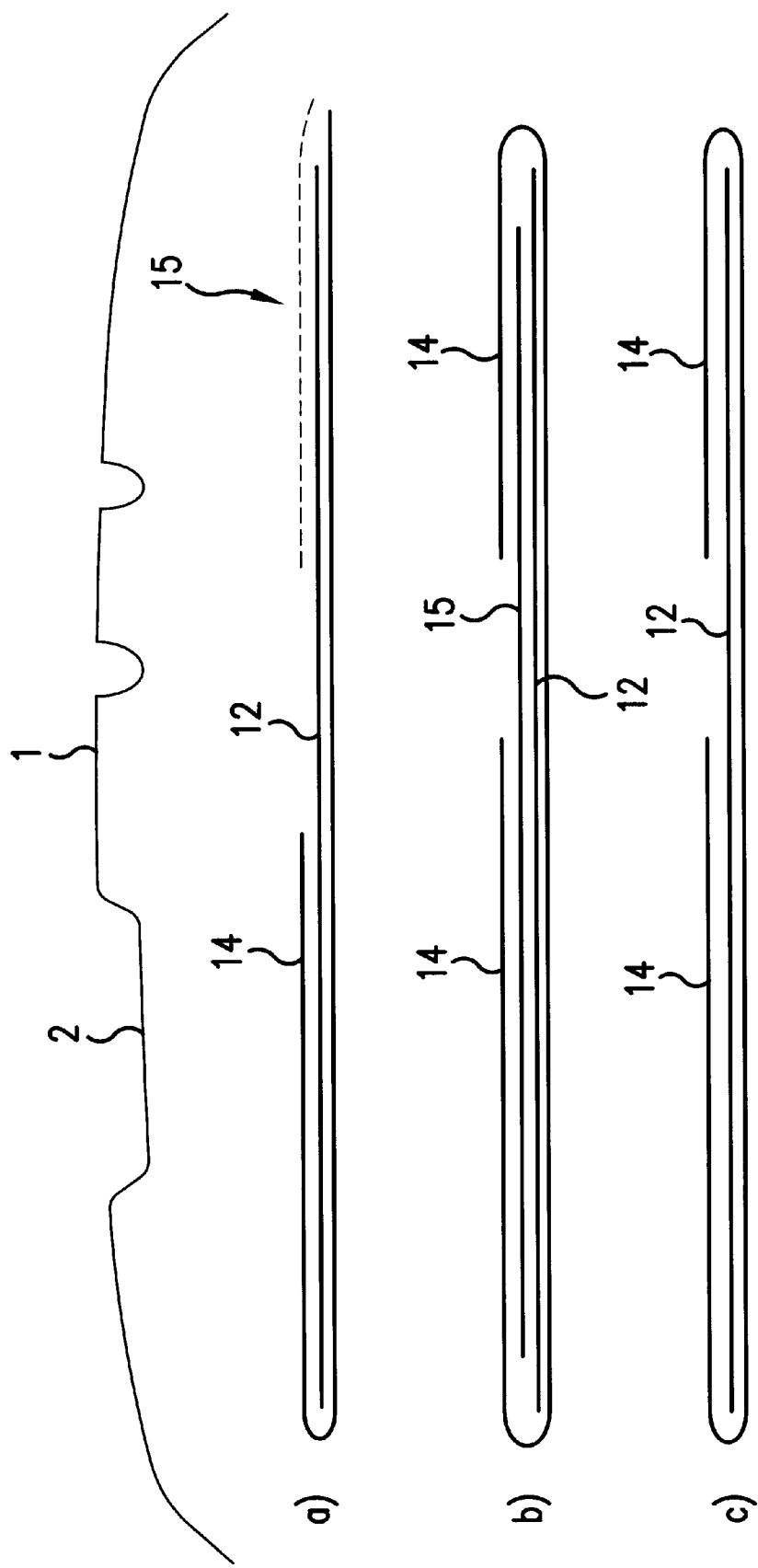
FIG. 3 A schematic representation of a tread contour with various possibilities of providing asymmetrical reinforcements using folded belt plies.

Again analogue to the method of representation of FIGS. 1 and 2, FIG. 3 shows asymmetrical designs realised by belt plies folded at least in part.

In embodiment version a), a further belt ply, consisting in particular of aramide, is folded at one side around a planar belt ply, consisting in particular of steel cord, with the limb or folded end 14 being led so far inwards that it spans the region of the groove 2. A nylon/winding bandage 15 can be provided at the opposite end of the belt arrangement.

Version b) shows a C-fold of an aramide belt ply which encloses two planar plies 12, 15, consisting in particular of steel cord and/or aramide. The folded end 14 disposed on the inner tire side is led further to the centre than the opposite folded end so that the gap region between the folded ends 14 is disposed in the right part of the tire. The region beneath the groove 2 is accordingly supported and reinforced by the longer folded end.

Version c) differs from version b) essentially by only one planar belt ply being enclosed by the C-fold, with the planar ply preferably consisting of steel cord and the folded ply of aramide.

Figure 4:
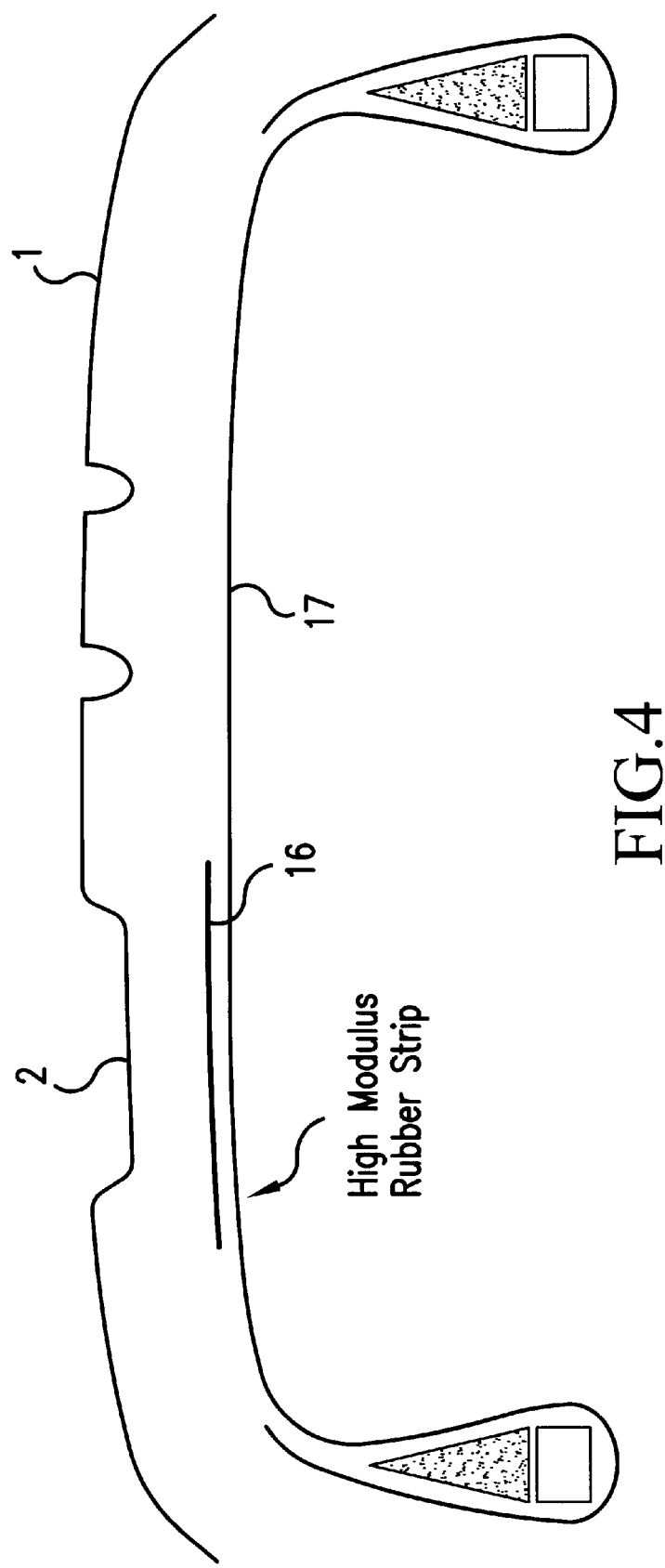
FIGS. 4 and 5 A schematic representation of further possibilities to provide asymmetrical reinforcements.

FIG. 4 shows an embodiment version of the invention in which the reinforcement of the region disposed beneath the groove 2 is realised by a circumferential rubber strip having a high modulus. 16 and preferably arranged directly adjacent the carcass ply 17.

Figure 5:
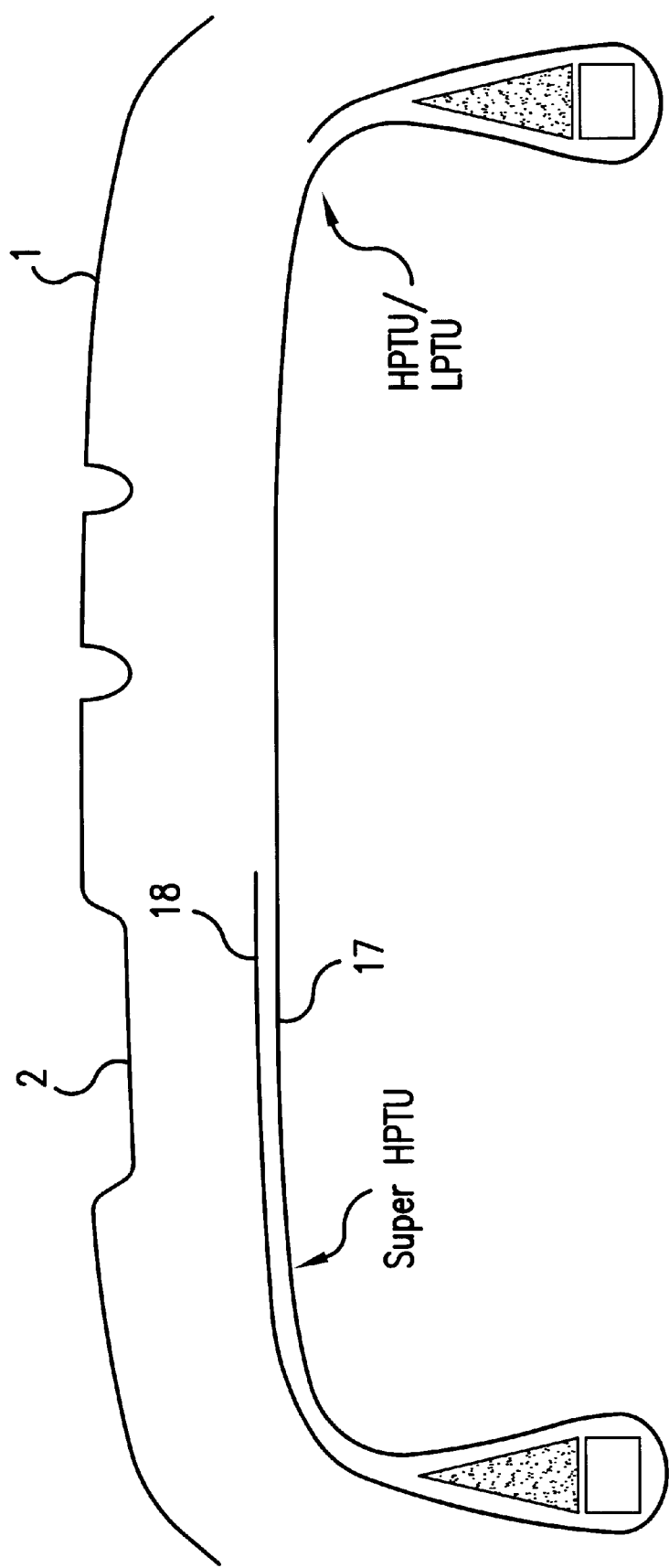

In accordance with the embodiment of FIG. 5, the reinforcement required beneath the groove 2 is achieved by a turned-over end of at least one carcass ply on that side of the tire where the overwide groove 2 is located, with the turned-over end being extended so far in the direction of the tire centre that said carcass ply end 18 spans the region of the groove 2 in the carcass assembly.

What is claimed is:

1. A vehicle tire having a carcass of at least one carcass ply extending between bead regions, a tread region and a belt arrangement disposed between the carcass and tread as well as a tread profile provided in the tread region and having at least one overwide circumferential groove which has a width of more than 30 mm wherein the tire region disposed beneath each overwide circumferential groove is made with additional localized reinforcement in the axial direction, said additional localized reinforcement comprising a rubber strip having a high modulus provided beneath each groove and adjacent the carcass.

* * * * *